United States Patent
Kochanneck

[11] Patent Number: 6,014,597
[45] Date of Patent: Jan. 11, 2000

[54] DISTRIBUTED ELECTRIC VEHICLE BATTERY EXCHANGE NETWORK

[75] Inventor: Uwe Kochanneck, Im Spähenfelde 25, D-44145 Dortmund, Germany

[73] Assignee: Uwe Kochanneck, Dortmund, Germany

[21] Appl. No.: 08/865,524

[22] Filed: May 29, 1997

[30] Foreign Application Priority Data

May 30, 1996 [DE] Germany .................. 196 21 668

[51] Int. Cl.$^7$ .............. B60S 5/06; G08G 1/123; H01M 6/50
[52] U.S. Cl. .............. 701/22; 320/109; 340/989; 340/993; 701/29; 701/36; 701/207; 701/300
[58] Field of Search ................. 104/34; 180/65; 340/825, 988–995; 701/22, 29, 36, 207, 300; 320/109

[56] References Cited

U.S. PATENT DOCUMENTS

| | | | |
|---|---|---|---|
| 4,567,359 | 1/1986 | Lockwood | 235/381 |
| 4,931,930 | 6/1990 | Shyu | 701/36 |
| 5,504,482 | 4/1996 | Schreder | 340/995 |
| 5,552,789 | 9/1996 | Schuermann | 342/42 |
| 5,612,606 | 3/1997 | Guimarin | 320/109 |
| 5,636,122 | 6/1997 | Shah | 701/207 |

Primary Examiner—Robert W. Downs

[57] ABSTRACT

A multiblock robot system for the logistic and energy supply of electro vehicles, composed of an E-pool net, a Distributed Electrical Vehicle Battery Exchange Network of E-stops, of Distributed Electric Vehicle Battery Exchange Stations, for electro vehicles with control post units and checkcard reader units, approximation sensor units, remote control antenna units, self operating battery chargers with column and below ground coupler units, self operating below ground battery changers. The electro vehicles provided with E-stop compatible sensor, control, coupling and battery units for A multiblock robot system for the logistic and energy supply of electro vehicles, composed of a self operating coupling on the E-stops. E-pool net electro vehicles controlled by E-pool net user checkcards for a multitude of users, controlling all door locking units with code controlled verification of access justification. Board computer units permitting communication with E-stops, multiblock energy stations, E-stop central computer units and E-pool net location detection satellite units. Multiblock energy stations, E-stops, electro vehicles and E-pool net, composing a powerful, mains independent, $CO_2$ free, interconnected network. All E-pool net units are composed of multiblock robot standard parts with socket flange booster chambers and rotation flange plug connections.

5 Claims, 9 Drawing Sheets

DISTRIBUTED ELECTRIC VEHICLE BATTERY EXCHANGE NETWORK

FIELD OF THE INVENTION

This application relates to a multiblock robot system for the logistic and energy supply of electro vehicles.

For the energy supply of electro vehicles it is common practise to charge the batteries from time to time and this is generally accomplished by a flexible rubber cable which is plugged manually on a mains wall socket. For the logistic of electro vehicles there are provided energy refuel stations with mains wall sockets, where the wall sockets are accessible by means of code keys and checkcards.

DESCRIPTION OF THE PRIOR ART

It is well known, as illustrated in U.S. Pat. No. 5,241,875, issued on Sep. 7, 1993, to provide a multiblock robot system with the advantage, that total robot systems can be restructured with only a few handling operations to the most different robot system solutions, by means of multiblock standard parts which are all of nearly the similar design. As disclosed in U.S. application Ser. No. 07/986/532 Filed Dec. 7, 1992 and 08/645/423, Filing/Receipt Date of May 13, 1996, standardisation and functionallity of multiblock robot systems have been furthermore extended by means of multiblock standard parts with driving and generator abilities and with booster chambers, the construction dimensions have been even more reduced, and as disclosed in the U.S. application Ser. No. 08/844,374 filed on Apr. 18, 1997, a multiblock robot system for the environment protecting energy generation from sun and wind power, the energy storage and for the energy disposition and delivery has been developed, such, that the application flexibility and the spectrum of standard parts compatible multiblock robotic systems can be further expanded.

SUMMARY OF THE INVENTION

It is an object of the present invention to increase further the advantages of economical manufacturing, functionality, the spectrum of operations and the application flexibility of these multi-axis robot systems by introducing a small number of additional multiblock robot standard parts, for an economical and ecologically friendly logistic, for more attractivity and improved acceptance of electro vehicles, thus, raising further the number of pieces of all, one to the other compatibel multiblock robot standard parts.

These objects are attained, by providing E-stops for electro vehicles with control post units, approximation sensor units, antenna units with integrated remote signal control units, furthermore with self operating column units and below ground coupler units for the battery current supply of electro vehicles, that the E-stops comprise further battery changers and the electro vehicles, self operating, E-stop compatible rotatable arms and multi-axis articulated arms for coupling with the E-stops, having moreover horizontal and vertical battery blocks for the self operating battery exchange with the battery changers of the E-stops. Further, that the E-stops and electro vehicles comprise to each other compatible checkcard readers, antenna units with integrated remote signal control units and approximation sensor units and, that the self operating navigation of the vehicles, the E-stop coupling, the coupling of the vehicles to each other and the battery exchange is being initiated by E-stop user checkcards with program control code and coded access justification, which are inserted to and readable from the checkcard readers of the control post units of column and below ground coupler units and of the vehicles board computer units, which release control impulses for the self operating E-stop function and are devaluated for the amount of E-stop user costs. Moreover, that the board computer units of the electro vehicles comprise control push buttons which realese a monitor dialog for the E-stop use, the E-stop control for coarse positioning and precision positioning, and that the E-stops have a network connection with multiblock energy stations, the public mains and the public phone network, furthermore that the board computer of the electro vehicles comprises modems and being connected with the phone network, having optional computer communications and monitor dialogs with foreign computers. And, that the E-stops and electro vehicles are composed of multiblock standard parts with rotation flange plug connections and attached socket fllange booster chambers, plug connected and optionally combined to each other.

This arrangement is a considerable improvement over the prior-art systems, that by the extension of multiblock-multi-axis systems to this very important and large field of user applications, the variety, functionality and economical manufacturing of multiblock robots and other multi-axis systems is furthermore improved. Additionally, this development improves the attractivity for the use of electro vehicles by the quick energy supply, easily installed below ground with low costs and expanded to a network, without any requirement to change the environment and which has no disadvantage in comparison with the time and costs for refuel operations of combustion motor vehicles. Moreover, this opens the possibility to build an electro vehicle pool with E-pool net electro vehicles not only for single, individual drivers but for the constant availabiltiy of a multitude of drivers with E-pool net user checkcards and coded user justification, without time limit and any restriction, which increases further the utilization degree of electro vehicles and is an incentive for private combustion motor vehicle owners to cancel the ownership in favour of the cost effective E-pool net membership, with the side effect of relieving the downtowns of all the vehicles which are rarely used but which need space. The novel features and advantages which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Multiblock robot designations and short cuts, terminology and identification reference character conventions:

The employed multiblock robot designations, short cuts, terminology and identification reference characters are identical with the employed notions and identification signs of the multiblock robot system documents, listed under the Description of the Prior Art. Thus, all multiblock robot system descriptions, refer to identical multiblock robot designations, short cuts, terminology and identification reference characters for an easy identification troughout of all previous multiblock robot system patents and patent applications, of parts, functional and operational principles. For new multiblock robot standard parts and devices of the present invention, designations, short cuts, terminologies and identification reference characters are implemented in analogy with the previous multiblock robot system inventions.

DETAILED DESCRIPTION

Figure 1:
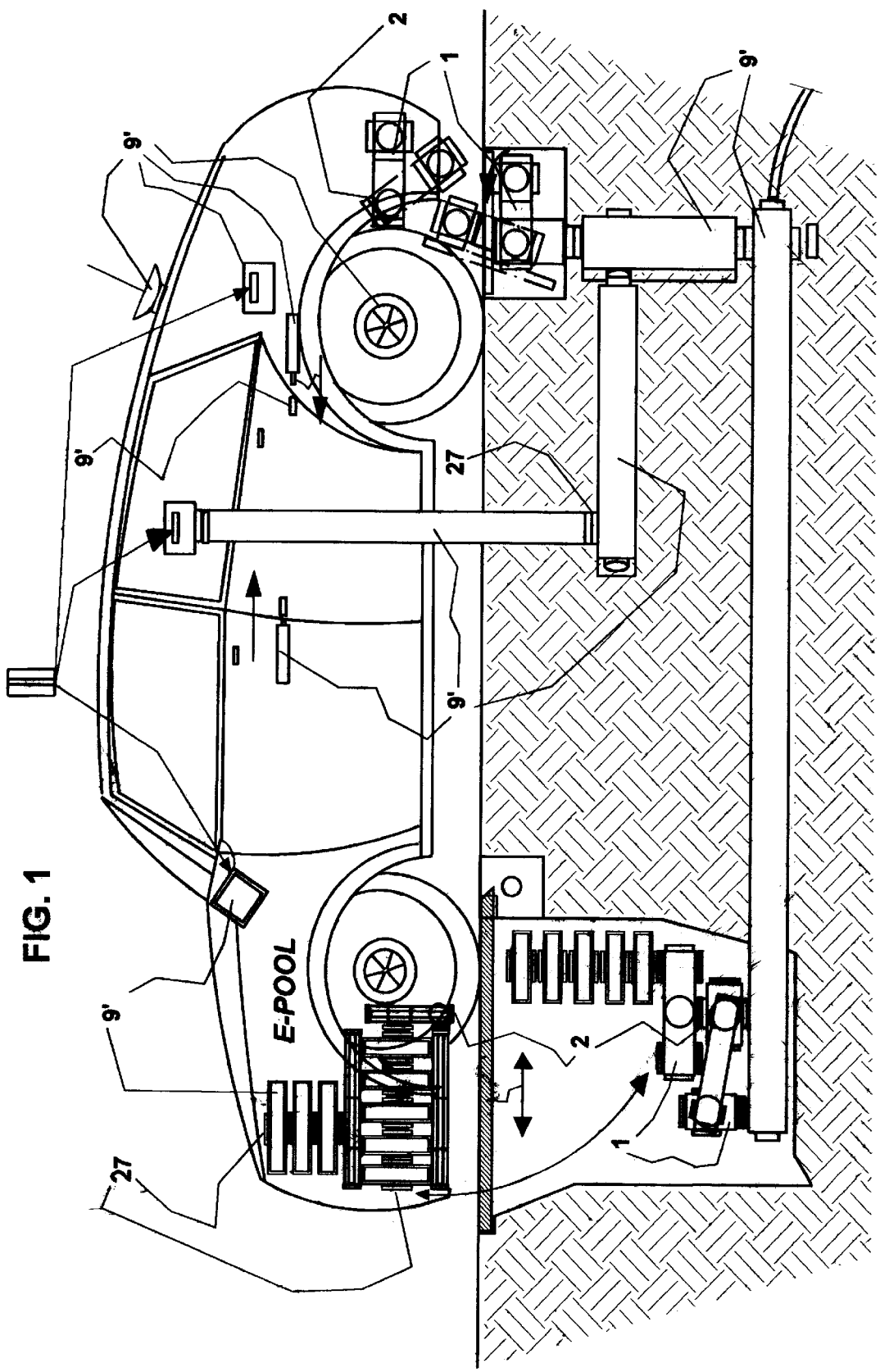
FIG. 1 is a side view of a multiblock robot system for the logistic and energy supply of electro vehicles, illustrating an E-stop, comprising multiblock socket flange booster chambers with integrated checkcard reader units and antenna units, further a self operating multiblock coupler unit and a below ground, under-vehicle multiblock battery changer, with above placed and adjusted multiblock electro vehicle before the coupling operation with the E-stop, having the E-stop compatible equipment, and the coupling being achieved between the below ground coupler and a multiblock-articulated arm of the electro vehicle, the arrows indicating the directions of rotation, locking and of checkcard insertions.
Figure 2:
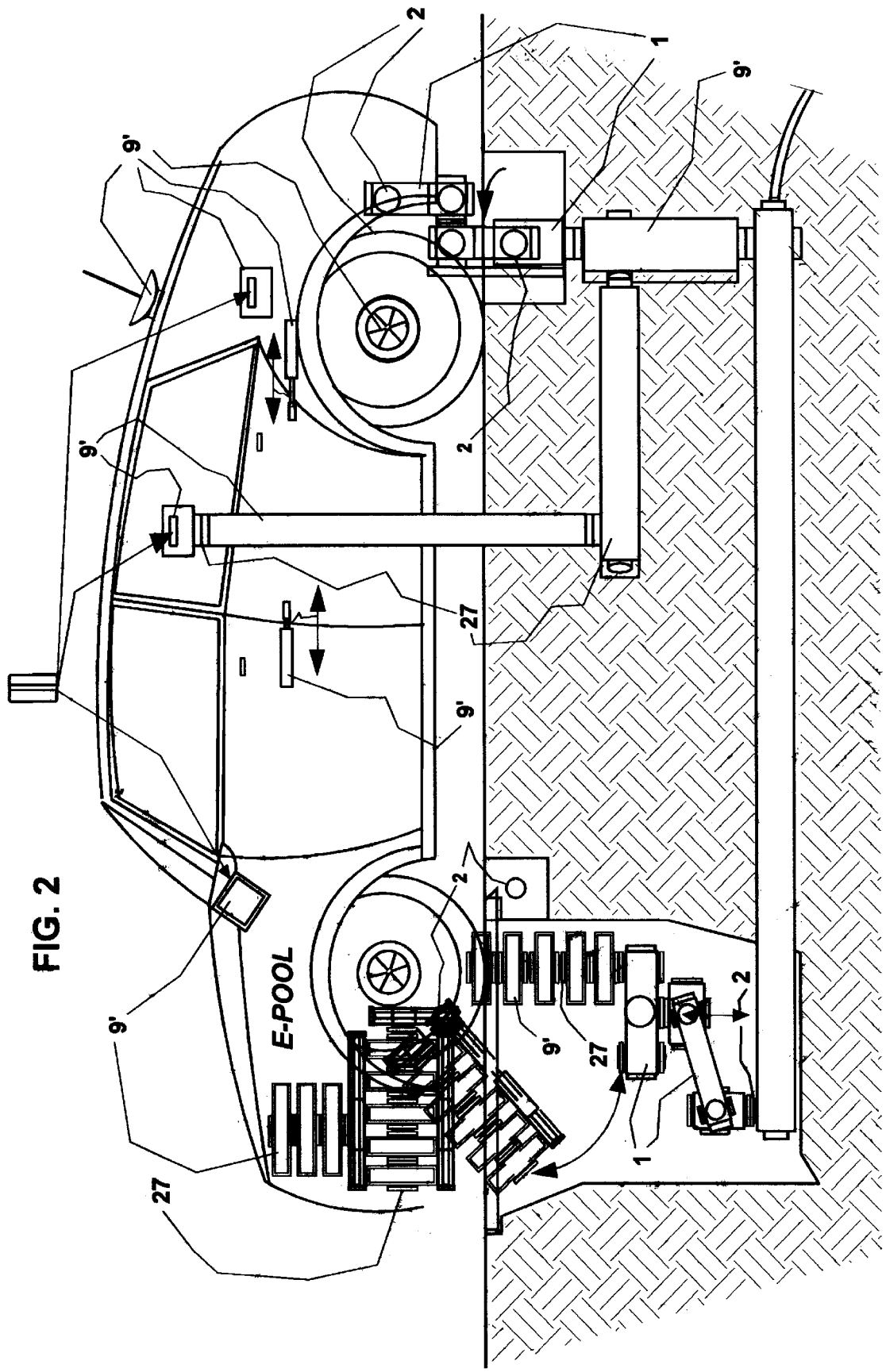
FIG. 2 is a side view of a multiblock robot system as shown in FIG. 1 with an accomplished coupling between the electro vehicle and the E-stop and the achievement of a battery changement.
Figure 3:
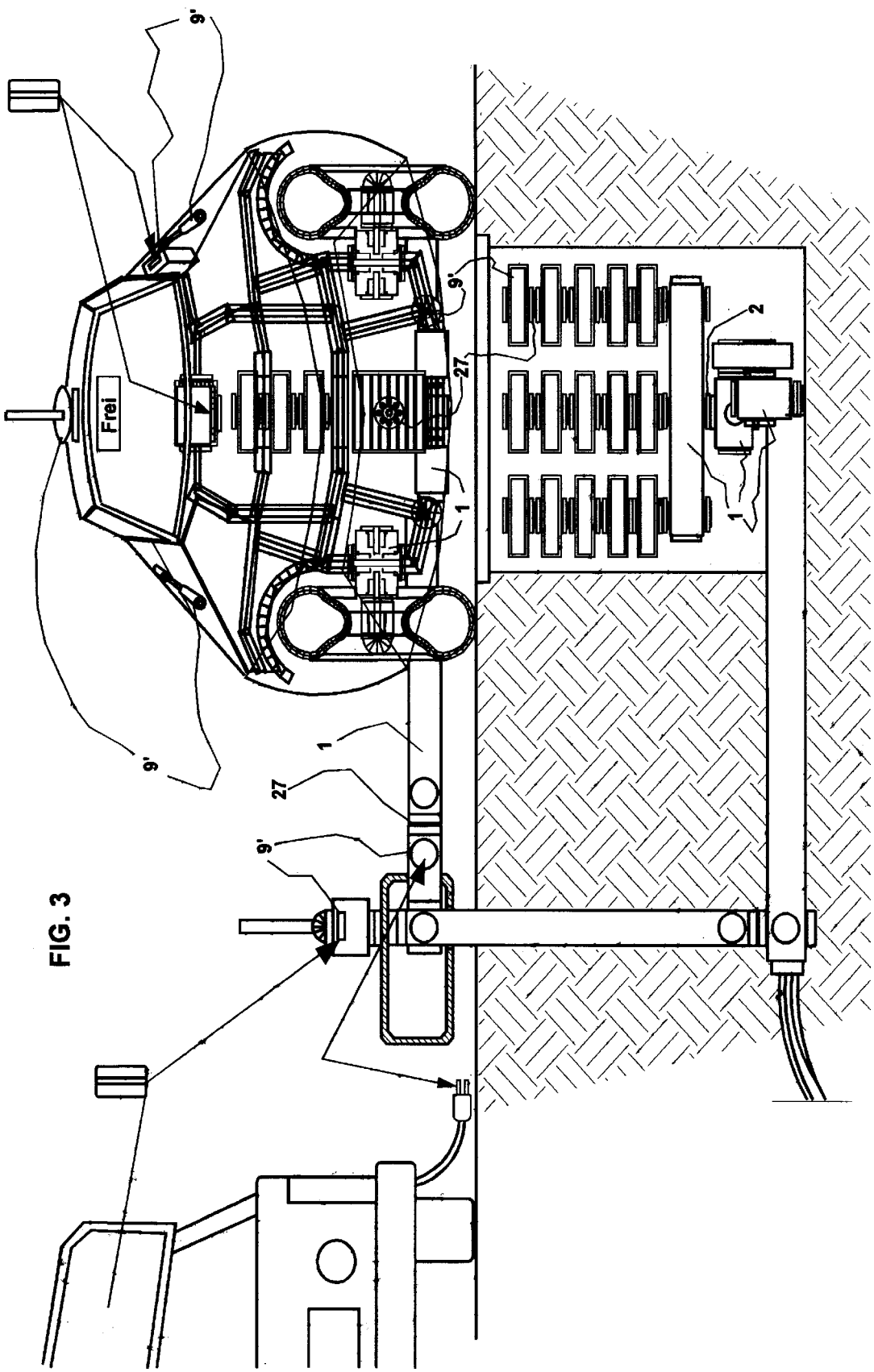
FIG. 3 is a front view of an E-stop and the energy supply of an electro vehicle, foreign to the multiblock system, with the coupling being accomplished by a column coupler unit, arranged laterally to the driving direction.

A multiblock robot system in one of its possible configurations and combinations persuant to the principles of this invention is broadly designated in FIG. 1 and FIG. 2. A network with a multitude of self operating multiblock E-stops and electro vehicles, with E-stop compatible, self operating coupler units, composes the basis of the multiblock robot system for logistic and energy supply of electro vehicles. The electro vehicles are subdivided in individual, person related electro vehicles, with clearly defined owners and E-pool net electro vehicles with a multitude of different, justified users. In the present embodiment, the E-stop comprises a vertical control post, which is postioned laterally to the driving direction, having a multiblock socket flange booster chamber 9' with integrated checkcard reader unit, and an antenna and remote control unit in head position. (The basic assembly, operational principles and standardisation objectives of multiblock robot socket flange booster chambers 9' are subject of U.S. Ser. No. 08/645,423). Centrally in relation to the driving direction, is provided a below ground coupler unit, having two multiblock standard parts 1 which compose a rotatable multiblock-arm with rotation ability about 90 degrees. This rotatable arm is embedded in the lane and receives a cover plate which is plug connected on the free flanges of the rotation flange plug connections 2 and rotates about 90 degrees, perpendicular to the lane, together with the rotatable arm, and in the uncoupled state, the cover plate covers the whole below ground coupler unit and closes it flush to the lane. Socket flange booster chambers 9' connect the below ground coupler unit with a self operating battery changer which consists of horizontally and vertically arranged multiblock standard parts 1 and composes a rotatable arm, which itself receives two vertically arranged battery blocks, composed of five individual socket flange booster chambers 9' with integrated battery units, vertically plug connected one above the other. The battery changer is also covered by a cover plate, which in this case closes the below ground opening by the cover plate with a horizontal movement, achieved by a socket flange booster chamber 9' and a multiblock standard part 1, and equally as the for the below ground coupler unit, this cover plate is flush to the lane. The battery changer and the below ground coupler unit are straight-lined arranged to each other and centrally to the driving direction, under the roadway. For the use of this E-stop, the multiblock electro vehicles are provided with multiblock socket flange booster chambers 9' with integrated board computer units and E-stop compatible user checkcard reader units. These multiblock electro vehicles are furthermore provided with a horizontally arranged battery block which is plug connected to a horizontal multiblock standard part 1, positioned under the vertical battery block and composing a rotatable arm, having the rotation axis in the height of the vehicles chassis. This battery block is provided for the manual removal of individual, one above the other placed, socket flange booster chambers 9' with integrated battery units and serves as a buffer battery unit, independently of the horizontal battery block, located under it. Moreover, these vehicles rear part comprise a multiblock rotatable arm with rotation axis in the height of the vehicles chassis, which is compatible to the rotatable arm of the below ground coupler unit of the E-stops, located stationary under the lane of the roadway. The driver of an electro vehicle has the E-stop option for a battery charge operation, needing a longer time of stay, or for a battery exchange, needing only a short time of stay. For this, the board computer of the multiblock electro vehicles are provided with an E-stop control push button for the initiation of the control signals. If the E-stop control push button has been pressed by the user, a monitor dialog follows with navigation assistance for coarse positioning and the approximation to the E-Stop by the user himself. Near to the E-stop and to the below ground coupler unit, the coupling is being achieved self operating by means of an exchange of wireless radio signals between the vehicles antenna unit and the antenna and remote signal control unit of the control post. The positioning control commands and the computation and adaptation of the approximation coordinates is self operating accomplished by means of the board computer unit and its evaluation of the control impulses, from the socket flange booster chambers 9' with integrated approximation sensor units which are centrally plug connected to the rotation flange plug connections 2,27 of the wheel hubs and the rear and front parts of the vehicles chassis and, from the electro vehicles compatible approximation sensor units of the below ground coupler units and battery changers, these being plug connected to its rotation flange plug connections 2,27. (The basic assembly, operational principles and standardisation objectives of multiblock robot rotation flange plug connections 2,27 are subject of all multiblock robot system documents, listed under the Description of the Prior Art). During the screen dialog, the driver can select an energy refuel option, the gradual, but cost-effective battery charge operation or alternatively, the speedy, but more expensive battery exchange. Additionally, there are information records of costs and the needed time for the selected operation. After a drivers push button selection of the board computer for a battery charge operation, the self operation coupling with the below ground coupler of the E-stop is accomplished by the rotatable arm, provided on the vehicles bottom side, and the rotation of its rotation flange plug connections 2 with plug units, in direction to the compatible rotatable arms plug sleeve units of the below ground coupler unit up to the final plug connection of these both parts, thus achieving the self operating plug connection and charging of the electro vehicle batteries. After a drivers alternative push button selection on the board computer unit for a battery exchange operation, the coupling proceedings with the E-stop are identical as for a battery charge operation, connecting the electro vehicle to the below ground coupler unit and, in order to save the battery energy of the vehicles buffer batteries, the battery exchange is supported by the main current supply of the E-stop. For the battery exchange is always one battery line free on the battery changer, such that first of all an empty battery block is being moved from the vehicle to the battery changer and than, a charged battery block is moved from the battery changer to the vehicle. For this, the program cycle for battery exchange provides that the cover plate is being opened. Afterwards, the empty vehicle battery block is rotated by the multiblock standard parts of the vehicle, on the free rotation flange plug connection 2 of the battery changer. For that purpose, the horizontally arranged multiblock standard part 1 of the battery changer is rotated in opposite direction in order to receive the discharged battery block. The magnetic lockings between the socket flange booster chambers 9' with integrated battery unit and the rotation flange plug connection 2 on the vehicle are unlocked, and the battery block is plug connected with the opposite socket flange booster chamber 9' with integrated battery unit, attached to the rotation flange plug connection 2 of the battery changer. The horizontally arranged multiblock standard part 1 of the battery changer, which just received the empty battery block, is now slightly lowered and rotated about 180 degrees so that the recharged battery block reaches the delivery position for the vehicles rotatable arm which is in the vertical rotated state, and it is than again slightly lifted up to the precise engaging and plug connection of the recharged battery block on the rotation flange plug connection of the vehicles rotatable arm. After that, the rotatable arm of the vehicle, with the recharged battery block is again rotated upwards and engages with the rotation flange plug connection 2 of the vehicles chassis and than, the magnetic lockings are activated and closed. At the same time, the cover plate of the battery changer is horizontally moved and closes the battery changers opening. Acoustical signals and visual displays on the screen of the board computer inform the driver that the battery charge or exchange operation has been successfully terminated and of the right moment for laving the E-stop. During the coupling with the E-stop and the energy refuel operation, the battery changer and the below ground coupler unit are totally covered by the contour of the vehicle, thus being a reliable protection of the whole equipment and the environment against any accident. There are no special constructional preconditions which have to be considered for the installation of an E-stop. It can be provided everywhere, as in driving direction on whatever roadside and parking areas. The installation is based on the coupling and plug connection combinations of socket flange booster chambers 9' and multiblock standard parts 1, always with changed built-in equipment, so that an E-stop network can fastly be provided. United regional networks consisting of a multitude with each other connected E-stops are provided for the reliable support of multiblock E-pool net electro vehicles, and are the important requirement for the support of a plurality of the most different legitimate users. E-pool net electro vehicles comprise a board computer with checkcard reader and an additional identical checkcard reader with the readers slot on the vehicles outside contour for insertion of the user checkcards, such that the access to the vehicles and to the utilization of the E-stops is based on the user checkcard with program control codes, as for the self operating all around door locking and unlocking units, which are installed in the door walls and are composed of socket flange booster chambers 9' with integrated magnetic locking units and rotation flange plug connections 2,27. The E-pool net user checkcards contain a basis program control code which, in the moment of the checkcard insertion to the checkcard readers slot, is supplemented by the board computer with an additional individual, person related user-program control code, being immediately effective to the all around door locking units and providing, that the original basis control code is no longer active, but only the person related user-program control code. The person related user-program control code has only a temporary effect and it is deleted by the board computer unit in the moment, when the respective user returns the E-pool net electro vehicle, such that the original basis program control code of all E-pool net users checkcards is again valid and the control of all around door locking units is self operating reprogrammed to accept again every checkcard of any justified E-pool net user, so that the returned and free E-pool net electro vehicles are again accessible for all other justified users. Maintenance of the network of E-stops and E-pool net electro vehicles is provided by E-centers and E-central computers with central control logistic, supervision and administrative programs. For this has each E-stop, with its multiblock socket flange booster chambers 9' and rotation flange plug connections 27 which are installed below ground, a connection with the communication lines of the public phone networks and with the current supply lines of the mains power supply, or all-together with the multiblock energy stations—in accordance with the energy delivery as illustrated under the Germans Appl. No. DE 196 15 943.1—. With the coupling between the E-stop and E-pool net electro vehicle is, beside the connection of the main current supply and charge current supply, also a connection provided between the communication lines of the multiblock standard parts 1 and the socket flange booster chambers 9' and therefore, is achieved the connection for data communication between the socket flange booster chamber 9' with integrated board computer unit and the E-pool net central computer, by means of the public phone lines. For this purpose receives each E-pool net electro vehicle a modem interface, so that an online computer dialog is provided between the E-pool net electro vehicles which are coupled with whatever E-stop and the E-pool net central computer. Persons with an E-pool net user checkcard, can airways occupy a free, actually not used E-pool net electro vehicle and use it for a short time and minor distance or for a long, unlimited period and unlimited distances. The E-pool net electro vehicles are marked and can be optically recognized for being E-pool net electro vehicles and the free status is indicated with a 'FREE' sign—as shown in FIG. 3—. Furthermore is provided a phone information service in the E-pool net center which can be called from checkcard users in order to get the position of the next free E-pool net electro vehicles, in relation to the own actual location. The E-pool net electro vehicles can be returned everywhere for termination of utilization. However, the board computer unit books self operating price reductions for the E-pool net user, if the vehicle has been returned to, and coupled with an E-stop after utilization. The board computer unit of each E-pool net electro vehicle which has been returned and which is free for the utilization of other E-pool net checkcard users, transmits self operating the free status and the availability to the E-pool net central computer, together with the precise, E-stop location data. E-pool net electro vehicles which are not returned to E-stops but left on whatever location, transmit in regular intervals radio detection signals to E-pool location detection satellite units and from there to the E-pool net center and the E-pool net central computer for the computation of the precise, actual position of the vehicle and for the general logistic-vehicle distribution planning. The board computer units of E-pool net electro vehicles are further designed in a manner for quick starting of E-stop navigation programs by computing navigation data from the own socket flange booster chambers 9' with integrated antenna and remote signal control units, by communication with the E-pool net location detection satellite units and by the socket flange booster chambers 9' with integrated antenna and remote signal control units of the E-stop control posts. E-stop informations keyboard strokes release navigation notes about the next, most advantages E-stop, this under the aspect of the most optimal value for the shortest distance between the own actual location and the next E-stop, the actual number of supported E-pool net vehicles and the number of free places for the coupling with the respective E-stop, and moreover, of the actual capacity of recharged battery units and of the compatibility of the own vehicles battery and coupler units, to the units of the E-stop. Free E-pool net electro vehicles are entered from an E-pool net user by means of his E-pool net checkcard, which is inserted to the slot of the checkcard reader unit on the vehicles outer contour. The board computer unit verifies the user-access justification, searches the basis program control code for opening of the doors and for occupation by the new user, and transmits the control signals to the socket flange booster chambers 9' with integrated door locking, such that all doors and the baggage boot can be oppened. Afterwards, the new user has to insert the checkcard to the reader units slot of the board computer unit and all checkcard data of the user is being stored and a screen dialog is being released. The user is asked to take only than possession of the vehicle if it is obviously in an impeccable condition, without any damage and not dirty. Furthermore, the capacity reserves are indicated, as the possible drive range without a battery recharge or exchange operation at an E-stop and the period till the next due maintenance interval of the vehicle. Than, the basis control code of the checkcard is supplemented by the additional and individual, person related user-program control code which is temporarily effective to the all around door locking units, thus preventing, that any other E-pool net user can open the doors and enter the vehicle for his own objectives. Whenever the E-pool net user has the intention to start his E-pool net electro vehicle, he has always to insert the checkcard in the reader units slot of the board computer unit, where it stays until the user leaves the vehicle. During utilization of the E-pool net electro vehicle, the checkcard data of a respective user are stored by the board computer and are continuously updated and supplemented with the duration of vehicle utilization, the number of miles performed, the previous number of vehicle E-stop utilizations for battery recharge and battery exchange operations. The updated administrative informations are immediately, self operating transmitted to the central computer in the moment when the E-pool net electro vehicle has been coupled to any E-stop and are evaluated by the central computer for computations of the vehicle utilization costs, E-stop utilization costs, and planning of maintenance and cleaning intervalls. E-pool net electro vehicles are provided with self operating distance protection and parking programs for the protection of the vehicle pool and of the different E-pool net users, with variable driving experience. These protection programs, the computation and continuous evaluation of the vehicles precise approximation coordinates are released by strokes to control keys of the board computer units. The changeing approximation coordinates are constantly delivered from the the socket flange booster chambers 9' with integrated approximation sensor units which are centrally plug connected to the rotation flange plug connections 2,27 of the wheel hubs and the rear and front parts of the E-pool net electro vehicles chassis. The distance protection to objects, E-pool net electro vehicles and other vehicles is provided by the board computer units computation of the approximation data, the evaluation of the minimal necessary safety distance in dependence on the temporary speed, and the direct self operating speed reduction of the E-pool net electro vehicles as a result of a reduced number of revolutions per minute of the driving units, which consists of combined multiblock standard parts 1 with rotation flange plug connections 2. Thus, the speed is self operating reduced for achieving the needed safety distance and at the same time, the driver receives optical and accoustical informations about the speed reductions and the necessary safety distance in accordance with the respective traffic situations. The precision positioning for self operating parking is achieved by means of the data from the approximation sensor units and of the computer evaluated parking coordinates in dependence on the needed minimal safety distance to objects and vehicles, and by transmission of the approximation sensor data to control commands which are transmitted through the current and communication channels of the multiblock standard parts 1 with the socket flange booster chambers 9', to the multiblock standard parts 1 with socket flange booster chambers 9' which compose the driving units, thus, the self operating parking is accomplished without the users intervention. Multiblock foreign vehicles are equiped and adapted with E-stop compatible multiblock standard parts 1 with socket flange boost chambers 9' for the utilization of multiblock E-stops. But also vehicles without multiblock compatible equipment, having only a flexible mains plug cable for recharging of batteries, can be supported on the E-stops. For this, the user has to drive near to the E-stops control post unit, and there, from inside of the vehicle, a checkcard has to be inserted to the checkcard reader unit of the control post unit, which is released immediately after reading of the users justification. With releasing of the checkcard, the below ground coupler unit rotates to the upward position and the rotation flange plug connections 2 are free for the manual plug in of the mains plug contacts. The user can now recharge his batteries because of the mains plug compatible plug sleeve units of the rotation flange plug connections 2,27. For the utilization of E-stops from vehicles foreign to the multiblock system, specific checkcards are provided, with several coded utilization units, which are always devalutated with one utilization unit per accomplished E-stop processing, up to the total devaluation of all utilization units. FIG. 3 of the drawings reveals, that the battery changer of this E-stop, comprises maximal four vertical battery blocks which are star-shaped arranged to each other. Instead of a below ground coupler unit, positioned in a straight line to the driving direction, a column coupler unit is here provided and arranged laterally to the driving direction. It is principally constructed as the vertical control post in accordance with FIGS. 1,2, but has only the height equivalent to the level of a vehicles chassis, shortly above the road or parking surface. Furthermore comprises the column coupler unit, plug connected in head position, a horizontal socket flange booster chamber 9' and an additional socket flange booster chamber 9' which composes a hood cover. The illustrated E-pool net electro vehicle comprises also horizontal socket flange booster chambers 9', and for the coupling with the E-stop, are these laterally rotatable under the vehicles chassis. The positioning process of an E-pool net electro vehicle on the E-stop for a coupling operation is identical to the positioning process for coupling as explained in FIG. 1,2 and it is consequently accomplished by means of the socket flange booster chambers 9' with integrated approximation sensor units which are centrally plug connected to the rotation flange plug connections 2,27 of the wheel hubs and of the approximation sensor in head position of the column coupler unit, and by the control signal exchange between the socket flange booster chamber 9' with antenna and remote control unit, provided on the roof of the E-pool net electro vehicle, and that located on top of the column coupler unit. The E-pool net users initiate the coupling with this E-stop without to leave the E-pool net electro vehicle. The coarse positioning is carried out by the respective user which receives navigation informations from the board computer unit for the approximation to the E-stop, and the precise positioning is achieved by an autopilot process which leads the E-pool net electro vehicle self operating to the E-stop, followed by the self operating coupling operation. The column coupler unit comprises a checkcard reader unit, located below the approximation sensor, and identical to the checkcard reader unit of the vertical control post unit and to the vehicle checkcard reader units. Multiblock electro vehicles which are not belonging to the E-pool net can yet couple with an E-stop, on condition that the vehicles are equiped with the corresponding compatible multiblock units. Also electro vehicles, foreign to the multiblock system and equiped with flexible plug cables only, are supported and can recharge its batteries by plug in to the plug sleeve unit of the rotation flange plug connection 2,27 of the columns coupler unit, as illustrated at the side of the E-pool net electro vehicle. The insertion of the checkcard for verification of the user justification and devaluation of one recharge-user unit, is here accomplished by the checkcard reader unit of the column coupler unit, plug connected arranged above the socket flange booster chamber 9' with integrated hood cover, on top of the column coupler unit.

Figure 4:
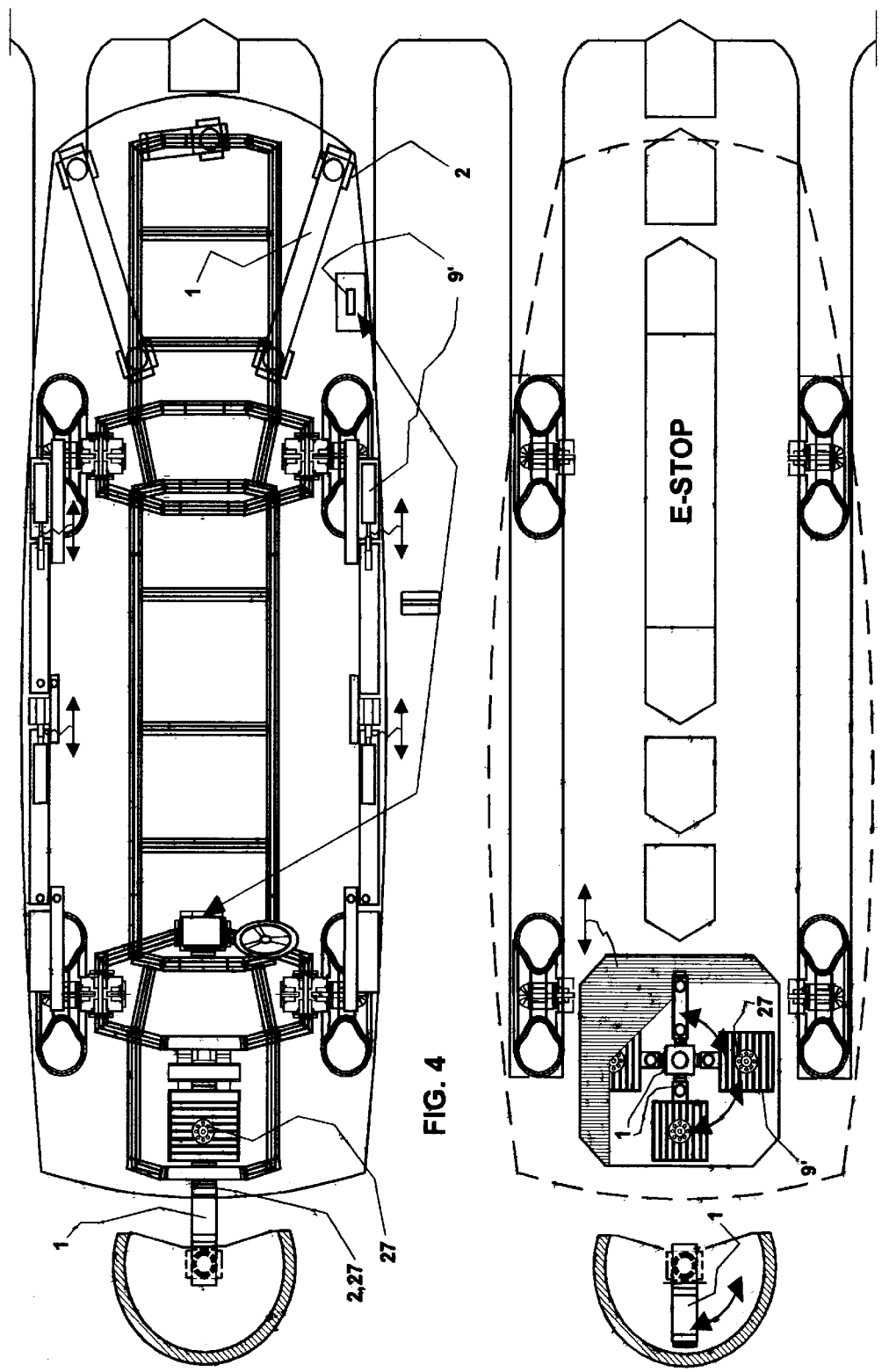
FIG. 4, is a plain view of an E-stop for two electro vehicles, one beneath the other at the same time.

It is to be noted in FIG. 4 that each of the side by side arranged E-stops is provided with one column coupler unit in head position of the battery changers. Each multiblock electro vehicle has a rotation flange plug connection 2,27 which is arranged in front and centrally to the vehicles track, and provides the self operating navigation by forward movements up to the frontal column coupler unit. The navigation process of the coarse positioning by the driver for the coupling operation, is here supported and accelerated by means of optical marks on the lane and of constructional track keeping aids installed on the road surface. The horizontal socket flange booster chamber 9' of the column coupler unit, belonging to the E-stop without a vehicle operating on the track, has been rotated under the socket flange booster chamber 9', so that it is contact protected located under the socket flange booster chamber 9' with integrated hood cover. The horizontal socket flange booster chamber 9' of the column coupler unit, belonging to the E-stop having a vehicle on the track in operation, is rotated to the frontal position, in direction to the vehicle and it is there coupled. The positioned vehicle is provided with two socket flange booster chambers 9' which in relation to the track direction, are laterally located and rotatable to the side direction for coupling with column coupler units. Additionally has this vehicle one back sided socket flange booster chamber 9' in central position, which is provided for the coupling with below ground coupler units.

Figure 5:
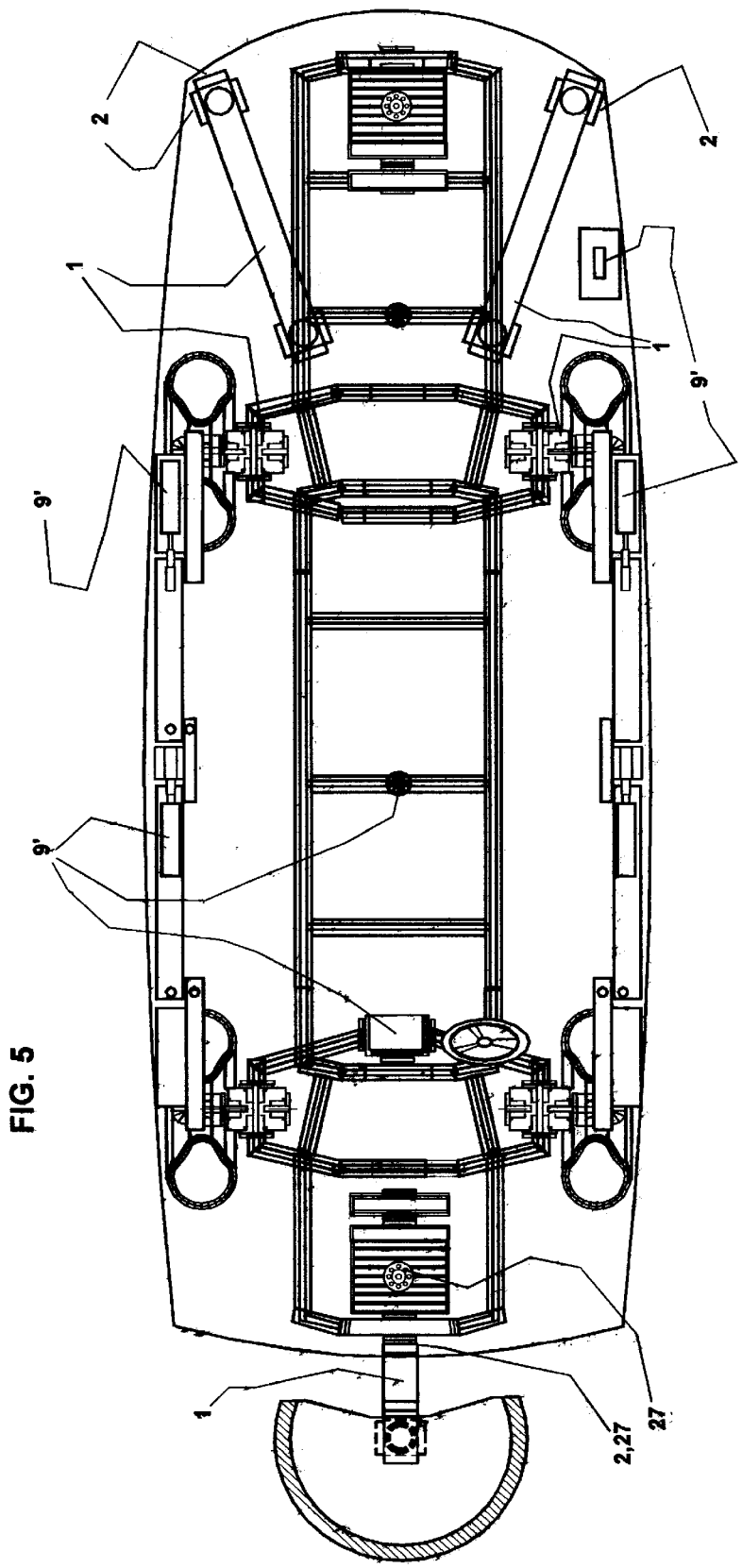
FIG. 5 is a plain view of an E-stop with a column coupler unit in head position and a multiblock electro vehicle with front and rear sided battery units.

The multiblock electro vehicles and the E-stops constructed persuant to the principles of this invention have different performance grades and equipments with corresponding battery accessories and arrangements. FIG. 5 reveals that this E-stop, consisting of a column coupler unit, is coupled with one vehicle in frontal position, which has centrally, front and back sided, horizontally arranged battery blocks and above these additional, vertically arranged battery blocks. The battery blocks are plug connected with its battery rotation flange plug connections 27 to the socket flange booster chambers 9' which are attached to the rotation flange plug connections 2 of the multiblock standard parts 1, belonging to the chassis of the vehicle. All multiblock control units, driving units, locking units, rotatable arms, cover units, battery units, sensor units, computer units, antenna and remote control units and the total structure of the vehicle and of the E-stop, composed of plug connected multiblock standard parts 1 with rotation flange plug connections 2 and the socket flange booster chambers 9' with rotation flange plug connections 27, are in all points interconnected by the centrally leaded current and communication channels and consequently accessible by the main current and battery charge current connection and so, through the connection to the E-pool net navigation and control system, all points can be reached from the E-pool net central computer for central control, computation and evaluation. For the professional utilization, the multiblock electro vehicles are provided with high performance board computer units which, apart from the pure navigation dialogs for coupling to the E-stops, permit the data transfer of business documents, fax and multimedia dialogs, through the online phone connection during the E-stop coupling, having the effect of an additional utilization efficiency of the E-stops and electro vehicles.

Figure 6:
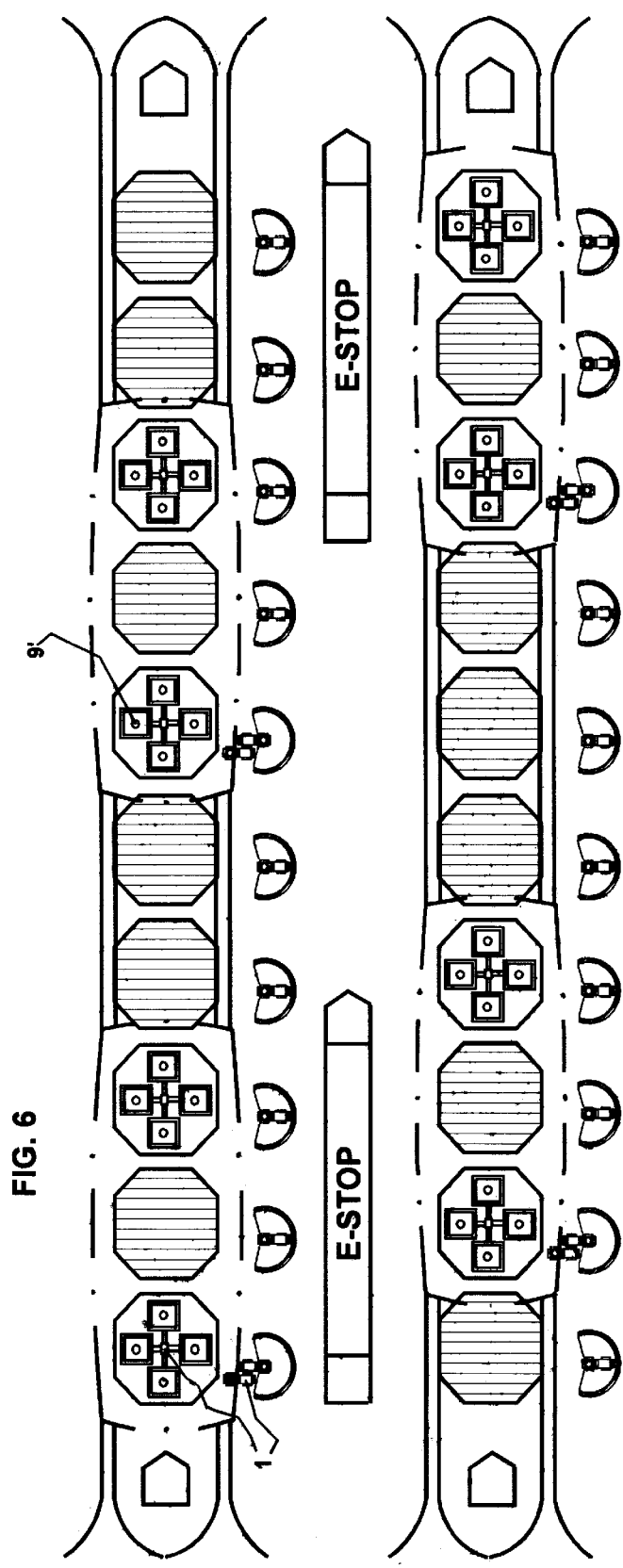
FIG. 6 is a plain view of a two-track E-stop and each track having ten column control units one behind the other and arranged laterally to the track directions.

The E-stop illustrated in FIG. 6 is provided for the flowing traffic and performs only quick battery exchanges without battery recharge operations. Each of the two adjacently arranged tracks comprises ten battery changers. The drivers with the objective of a battery exchange push the control key for battery exchange. This releases the remote control contact to the E-stop and to the individual column coupler units which are arranged in lateral position to each of the battery changers, thus already receiving navigation signals for coars positioning during approximation of the vehicles to the E-stop and indicating to the drivers, which of the tracks has to be selected in order to achieve the fastest battery exchange. As soon as the driver reaches the E-stop marks and the track for battery exchange, the vehicle itself controls self operating the precise positioning and accomplishes the coupling without the drivers intervention. Users of E-pool net electro vehicles with just sufficient current in the own buffer batteries, have the option to select by the board computers dialog the fastest and most cost effective battery exchange supported by the own current supply, without to couple to the E-stops column coupler. The battery changers are arranged one behind the other, subdiveded in raster distances, permitting vehicles with back and front sided battery blocks to exchange both blocks together at the same time with one exchange cycle only, without any new positioning movement on the track. Instead of the column coupler units, the E-stop tracks comprise also below ground coupler units or even both types optionally combined one behind the other. The extent of the battery exchange performance is in any case stored by the board computer and transmitted through the current and communication channels of the E-pool net electro vehicle and of the E-stops, to the E-pool net center and the there located E-pool net central computer, for general evaluation.

Figure 7:
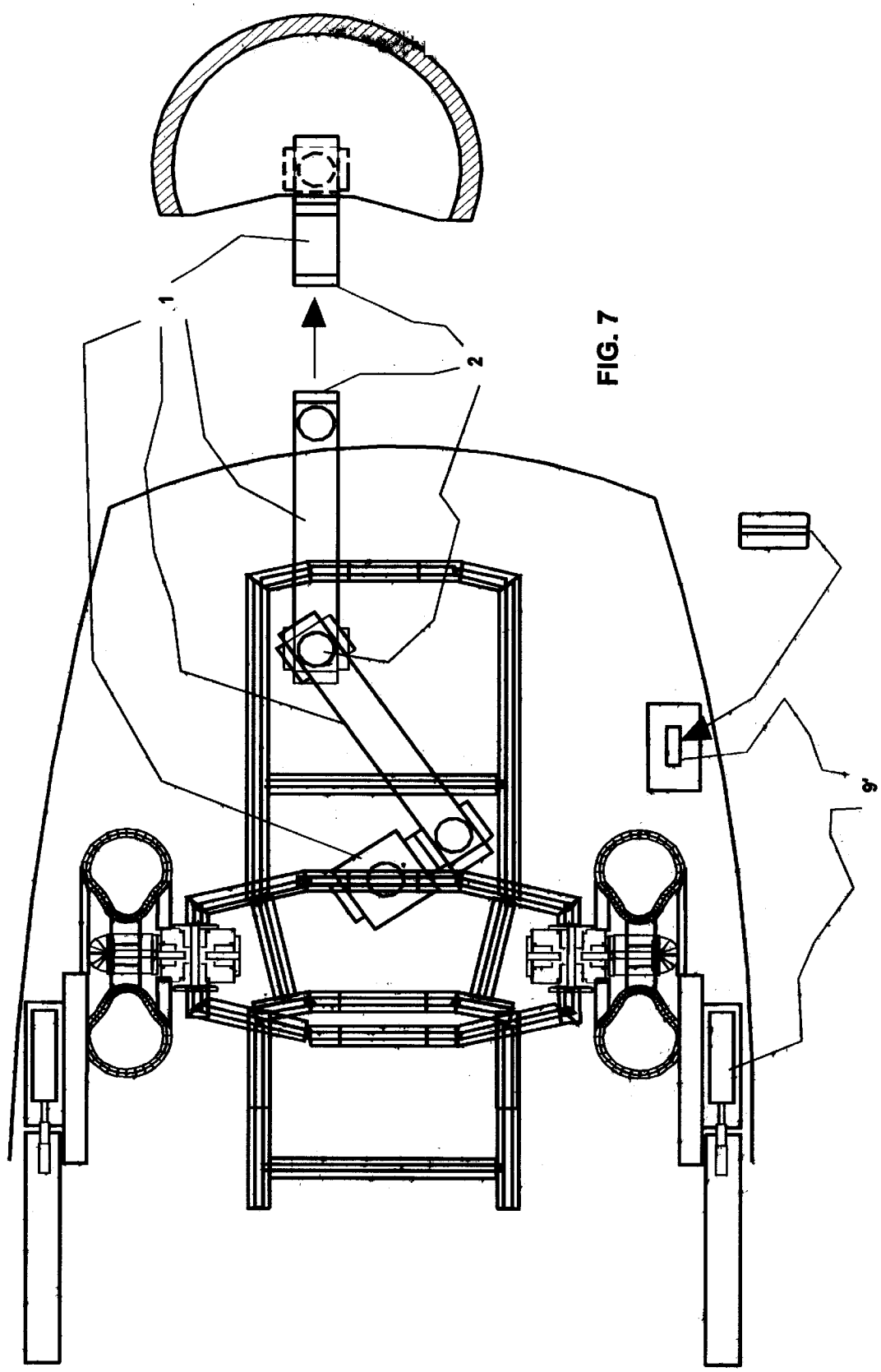
FIG. 7 is a plain view of an electro vehicles rear side and illustrates the coupling by means of a multiblock robot articulated arm, with a column coupler unit of an E-stop, positioned in opposite direction.
Figure 8:
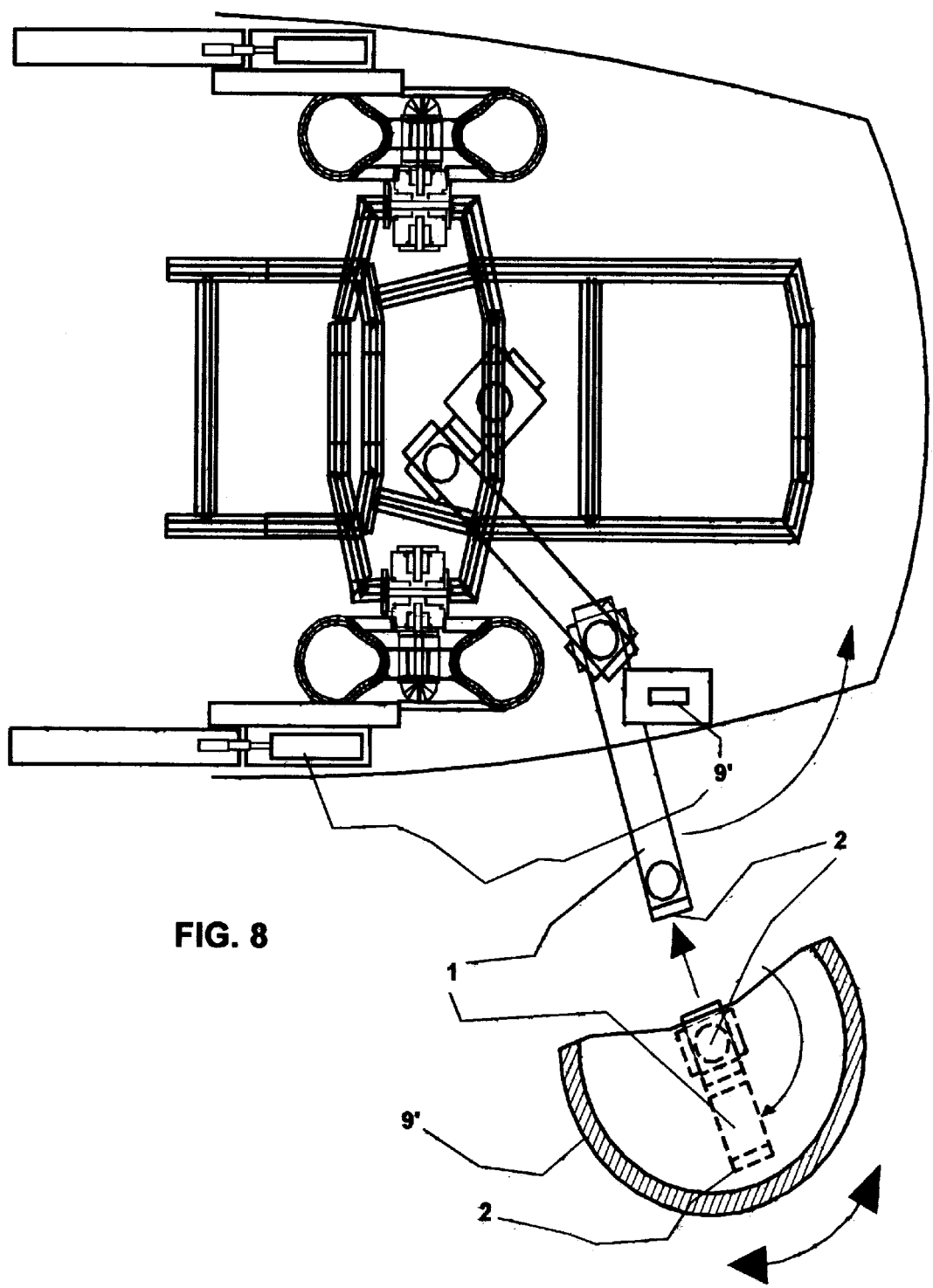
FIG. 8 is a plain view in accordance with FIG. 8 and a column coupler unit, positioned laterally to the driving direction.

As has been heretofore pointed out, the E-stops and electro vehicles may have the most different equipment, combination and arrangement for the task intended to be accomplished. FIGS. 7–8 illustrate the primary design of E-stops, consisting only of one column coupler unit for battery recharge operations. The electro vehicles need not to have E-stop compatible rotatable arms, but merely front and back sided rotation flange plug connections 2,27 and are positioned by the driving movements and navigation of the vehicles, straight on in direction of the column coupler unit up to the final and secured plug and coupling point between the rotation flange plug connections 2,27 of the vehicles and of the column coupler unit, and they are than self operating coupled with each other. For universal, self operating coupling possibilities to E-stops with column coupler units and also below ground coupler units, from out of the most different driving positions, the electro vehicles are furthermore provided with vertical and horizontal multiblock standard parts 1 and socket flange booster chambers 9', which are rotatable below the vehicles in direction to the column and below ground coupler units. Additionally are multi-axis articulated arms provided under the vehicles which spare vehicle mouvement corrections for precise positionings and enable the quick, self operating coupling from out of whatever driving or stoppage position of the vehicle in relation to front, lateral or below ground coupler units of the E-stops. In the present illustration of FIG. 7, a multi-axis multiblock articulated arm accomplishes a self operating coupling with a back sided arranged column coupler unit, and in accordance with the FIG. 8, with a laterally located column coupler unit.

Figure 9:
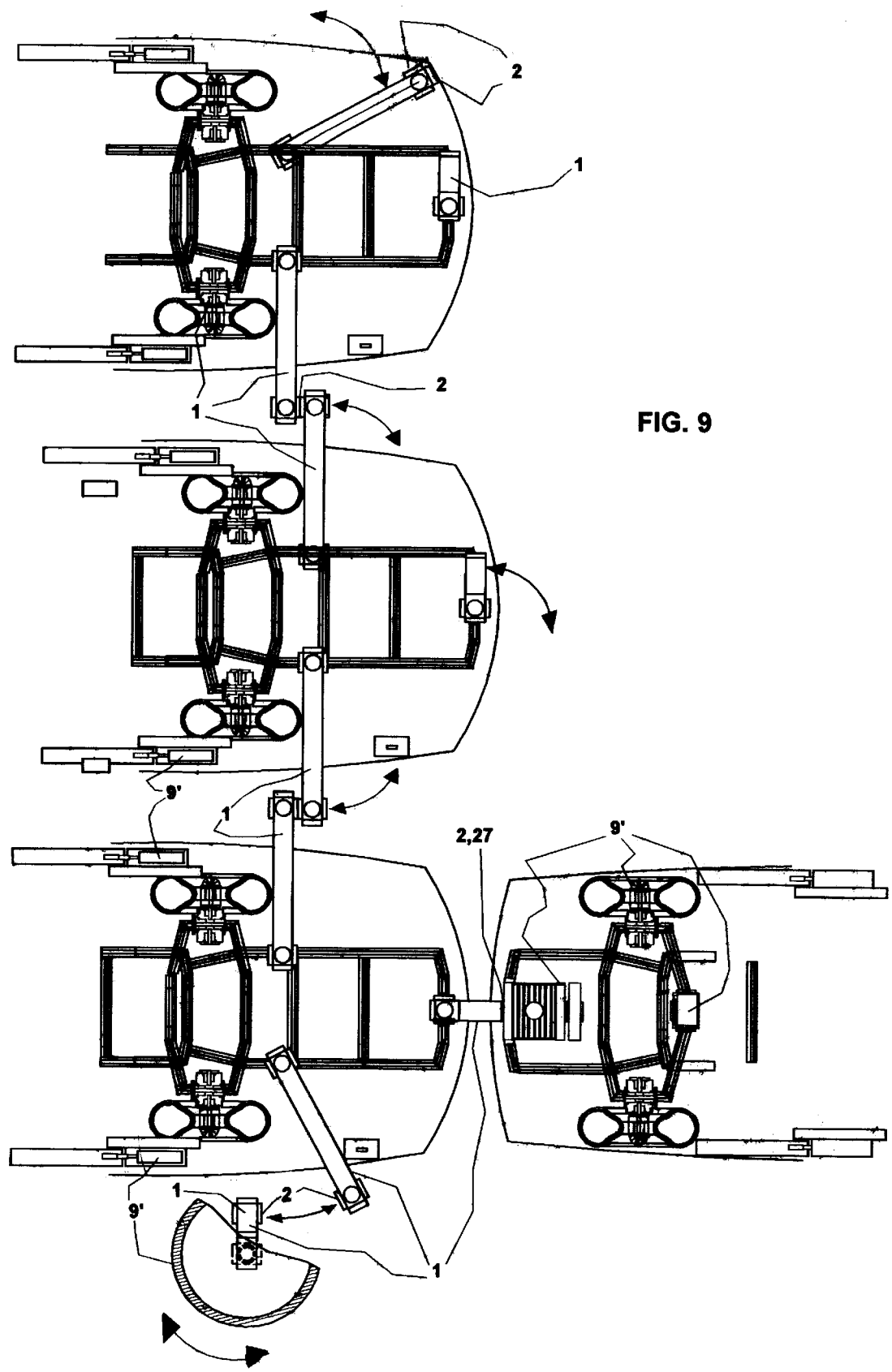
FIG. 9 is a plain view of four multiblock electro E-pool net vehicles being coupled on one column coupler unit, and coupled to each other by multiblock-articulated arms.

FIG. 9 shows four E-pool net electro vehicles free for utilization which are coupled to one column coupler unit. The E-pool net electro vehicles are here connected to each other by the own rotatable arms, located under the vehicles, and only the first E-pool net electro vehicle near to the column coupler unit accomplishes the coupling with the socket flange booster chamber 9' and the rotation flange plug connection 2, as revealed in the present drawing, in direction of the arrow. The current and communication connection is achieved by the coupled rotatable arms in lateral position, for the E-pool net electro vehicles arranged in straight line with the column coupler unit, and for the E-pool net electro vehicle in the second line beneath, by the direct frontal coupling from E-pool net electro vehicle to E-pool net electro vehicle, such that the battery recharge can be performed from the E-stop with only one coupler unit, to all E-pool net electro vehicles at the same time, as also the battery exchange, this under the precondition that the E-stop is provided with battery changers. The E-pool net electro vehicles are entered and operated by the E-pool net users, always from the last, outside positioned E-pool net electro vehicles, in direction to the inside positioned E-pool net electro vehicles up to the first E-pool net electro vehicle, positioned beneath the column coupler unit, or E-pool net electro vehicles are returned and additionally coupled to the last outside positioned E-pool net electro vehicle of a row.

For the deposition of the E-pool net electro vehicles, remote control signals and control impulses are transmitted from the board computer units to the antenna and remote control units for the self operating precise positioning and the coupling to the deposited E-pool net electro vehicles. Consequently, the coupling between the arriving E-pool net electro vehicles and the deposited E-pool net electro vehicles in waiting position for utilization, is achieved by means of the lateral rotatable arms and a sidways rotation, or by means of the back sided rotatable arms or by the multi-axis multiblock articulated arms. If an E-pool net user takes possession of an E-pool net electro vehicle, the rotatable arm of the E-pool net electro vehicle and that of the E-pool net electro vehicle in adjacent position are rotated backwards. The coupling of several E-pool net electro vehicles to only one coupler unit is likewise achieved, if the E-stop is provided with a below ground coupler unit, instead of a column coupler unit. The individual, existing equipment components of E-stops are optionally combined and supplemented by control post units with integrated checkcard reader units, remote control antenna units, below ground coupler units, column coupler units which are arranged under the roads and lanes, battery changers, Multiblock Robot Energy Stations with battery dispensers and belonging battery changers —in accordance with DE 196 15 943.1—and further multiblock standard parts 1 and socket flange booster chambers 9'. In the same manner, the multiblock electro vehicles are optionally combined with horizontally arranged buffer battery blocks and vertically rotatable arms, multi-axis articulated arms, socket flange booster chambers 9' with integrated computer units and checkcard reader units, socket flange booster chambers 9' with integrated locking units and checkcard reader units with insertion slots provided on the outer contour, and combined with further multiblock standard parts 1 and socket flange booster chambers 9', compatible to the respective E-stop equipment. The battery exchange principle and the optional substitution of the battery recharge operations by means of the deposition of empty battery blocks to the E-stops and the immediate exchange and delivery of fully recharged battery blocks without recharge-waiting times, prevents a performance breakdown during the electro vehicles active traffic utilization, caused by declined battery power. This active battery-exchange principle is supplemented by the alternative option of passive battery recharge operations during the phase of the electro vehicles deposition and the suspended traffic utilization, by means of coupling to the column and below ground coupling units. The one solution supports and completes the other, composing the combined operational E-stops. The users of the multiblock electro vehicles are constantly informed by the board computer about the actual battery charging state and, if the power decline reaches a minimum, the board computer unit initiates the self operating switch to the buffer batteries and the necessity of a battery exchange or of a battery recharge operation is displayed, together with informations about the performance reserves and possible driving miles with the remaining battery power of the buffer batteries, as also about the next advantages E-stop location in relation to the own actual vehicle position. The user selects the battery exchange if the intended travel has to be extended for a longer period. The battery recharge operation is selected, if the board computer unit displays that the intended destination is reachable with the remaining buffer battery power, and that the expected duration of the electro vehicles standstill period permits to recharge sufficiently the driving battery block. Thus, the battery exchange is not a temporary solution, only for the case of an accidental technical battery failure or wear, but the active electro vehicle refuel solution. The battery changers of the E-stops take care of the battery recharge for the drivers and replace immediatly discharged battery blocks by recharged battery blocks. The E-stop center communicates continuously with the E-stops and is always informed about the charging state of the existing battery blocks. A constant function and service reliability self test ensures that damaged battery blocks and battery blocks with restricted functional and operational reliability are retained and not longer used for battery exchanges, but are located by the central computer and are exchanged by E-stop-service electro vehicles for the purpose of maintenance, whereas the exchanged battery blocks are instantly replaced by impeccable battery blocks. Therefore, the E-stop user himself has not to ensure the perfect technical and operational conditions of his battery units. The costs for warranty and responsibility for the always impeccable, operable and recharged battery blocks are user related registered by means of the E-stop user checkcards and the board computer units, and are finally recorded by the central computer.

I claim:

1. A Distributed Electric Vehicle Battery Exchange Network comprising:

E-stops for electro vehicles, each providing control post units, approximation sensor units, antenna units with integrated remote signal control units, with self operating column coupler units and below ground coupler units for the battery current supply of electro vehicles;

said E-stops providing battery changers and said electro vehicles providing self operating, said E-stop compatible rotatable arms and multi-axis articulated arms for coupling with said E-stops;

said electro vehicles accomodating horizontal and vertical battery blocks for the self operating battery exchange with said battery changers of said E-stops;

said E-stops and said electro vehicles providing to each other compatible checkcard reader units;

said antenna units with said integrated remote signal control units and with said approximation sensor units, for accomplishing self operating navigation processes;

said electro vehicles and said E-stops with said self operating navigation processes, for achieving the self operating coupling of said electro vehicles to said E-stops, the coupling of said electro vehicles to each other and said battery exchange operations;

said electro vehicles and said E-stops providing user checkcards, having program control codes and access justification codes, releasing control impulses and initiating all said processes and operations by insertion to said checkcard reader units of said control post units, of said column and below ground coupler units, and of said vehicle board computer units;

said user checkcards, performing initialisation of self operating devaluation for the amount of user costs for said E-stop utilization, with one utilization unit per E-stop utilization, up to the total devaluation of all utilization units;

said board computer units of said electro vehicles, provided with push buttons, initiating monitor dialogs for the use of said E-stops, supervision and control of coarse positioning and precision positioning of said electro vehicles on said E-stops;

said E-stops, for everywhere installation, including interconnected networks with multiblock energy stations, the public mains and the public phone network;

said board computer units of said electro vehicles receiving modems, for interconnecting with the public phone network, for optional communications and for monitor dialogs with foreign computers;

said E-stops and said electro vehicles being built up from optional combinations and plug connections of multiblock standard parts with socket flange booster chambers and rotation flange plug connections.

2. A Distributed Electric Vehicle Battery Exchange Network as claimed in claim 1 wherein:

said electro vehicles comprise individual electro vehicles provided with said board computer units, integrating said checkcard reader units and having additional said checkcard reader units with the insertion slots on the outer contour of said individual electro vehicles, permitting initialisation from outside;

said individual electro vehicles comprise self operating, all around door locking units installed in the outer walls and doors, iniated for opening and closing by means of E-stop user checkcards having an individual, person related, temporarily effective program control code, for ensuring the access and utilization of said individual electro vehicles and said E-stops by justified users only;

said individual electro vehicles compose E-pool net electro vehicles for the utilization of a multitude of different users, operated by E-pool net user checkcards with basis program control codes, being supplemented with said individual, person related, program control code by said board computer units, effective to said all around door locking units in the moment of user acception of said E-pool net electro vehicles, and said individual, person related program control code being deleted by said board computer units in the moment of users final deposition of said E-pool net electro vehicles and said all around door locking units accepting again said basis program control codes of said E-pool net checkcards and of all E-pool net users;

said individual electro vehicles and said E-pool net electro vehicles being plug connected and built up from said multiblock standard parts and said socket flange booster chambers with said rotation flange plug connections.

3. A Distributed Electric Vehicle Battery Exchange Network as claimed in claim 2, including:

E-pool net centers with E-pool net central computers for the control, supervision, maintenance of said E-stops and said E-pool net electro vehicles and for the delivery of said E-stop checkcards and said E-pool user checkcards to users;

said E-pool net central computers and composing an interconnected network with said E-stops, said board computer units of said individual electro vehicles and of said E-pool net electro vehicles, being coupled, supported and connected with said E-stops and having online data exchange and control dialogs for navigation and administration, through the public phone lines.

4. A Distributed Electric Vehicle Battery Exchange Network as claimed in claim 3, wherein:

said board computer units of each said E-pool net electro vehicle if being free, returned and coupled to one of said E-tops, transmitting self operating the free status to said E-pool net central computers;

said E-pool net electro vehicles are operable for the everywhere deposition after utilization and if not returned and coupled to one of said E-stops, transmitting radio detection signals in regular intervals by means of said socket flange booster chambers with integrated antenna and remote control units of said E-pool net electro vehicles, communicating with E-pool net location detection satellite units, provided and installed for receiving said radio detection signals and for determination and transmission of the precise location of said deposited E-pool net vehicle to said E-pool net central computer units for evaluation of the location data and for logistic plannings of said E-pool net electro vehicles;

said board computers of said E-pool net electro vehicles having an E-Stop information keyboard and push buttons for releasing a navigation program by means of said socket flange booster chambers with said integrated antenna and remote control units of said E-pool net electro vehicles and said antenna and remote control units of said control posts and said column coupling units belonging to said E-stops, generating navigation informations for best reaching the next, most advantages E-stops, under consideration of the optimal values for the shortest distance between the own actual location and said E-stops, the actual frequentation, the actuall recharged battery capacity, the number of free places for the coupling and a compatibiltiy check of said own E-pool net electro vehicles coupling and battery equipment to the existing and corresponding equipment of said E-stops.

5. A Distributed Electric Vehicle Battery Exchange Network as claimed in claim 2, wherein:

said E-pool net electro vehicles are provided with said socket flange booster chambers with said approximation sensor units, centrally plug connected to said rotation flange plug connections of the wheel hubs and the rear and front parts of said E-pool net electro vehicles chassis, for ensuring a programed safety distance to objects, other vehicles and to others of said E-pool net electro vehicles, by said board computer units computation of the approximation data, the evaluation of the minimal necessary safety distance in dependence on the temporary speed, and the direct self operating speed reduction of the E-pool net electro vehicles, as a result of a reduced number of revolutions per minute of driving units of said E-pool net electro vehicles, consisting of said combinened multiblock standard parts;

said programed safety distance indicating optically and accoustically inside of said E-pool net electro vehicles the actual necessary safety distance and the self operating performed speed reductions in accordance with the traffic circumstances;

said board computers of said E-pool net vehicles are provided with a parking keyboard and push buttons for initiating self operating parking processes, controlled by said board computer units based on transmitted approximation data and parking coordinates from said approximation sensor units with evaluation of the minimal needed safety distance to objects, and other vehicles;

said board computer units transmitting parking commands through the current and communication channels of said multiblock standard parts and socket flange booster chambers to said driving units for self operating carrying out parking movements without the users intervention.

* * * * *